(12) United States Patent
Hill

(10) Patent No.: US 12,459,634 B2
(45) Date of Patent: Nov. 4, 2025

(54) AIRCRAFT CONTROL APPARATUS

(71) Applicant: HILL GROUP TECHNOLOGIES LIMITED, Stafford (GB)

(72) Inventor: Jason Hill, Rugeley (GB)

(73) Assignee: HILL GROUP TECHNOLOGIES LIMITED, Stafford (GB)

( * ) Notice: Subject to any disclaimer, the term of this patent is extended or adjusted under 35 U.S.C. 154(b) by 213 days.

(21) Appl. No.: 18/022,497

(22) PCT Filed: Aug. 23, 2021

(86) PCT No.: PCT/GB2021/052178
§ 371 (c)(1),
(2) Date: Feb. 21, 2023

(87) PCT Pub. No.: WO2022/038380
PCT Pub. Date: Feb. 24, 2022

(65) Prior Publication Data
US 2023/0312082 A1 Oct. 5, 2023

(30) Foreign Application Priority Data
Aug. 21, 2020 (GB) ..................................... 2013119

(51) Int. Cl.
  *B64C 13/04* (2006.01)
  *B64C 27/56* (2006.01)
  *B64D 43/00* (2006.01)

(52) U.S. Cl.
  CPC ............ *B64C 13/042* (2018.01); *B64C 27/56* (2013.01); *B64D 43/00* (2013.01)

(58) Field of Classification Search
  CPC ... B64C 13/042; B64C 13/0421; B64C 27/54; B64C 27/56; B64D 11/0689
  See application file for complete search history.

(56) References Cited

U.S. PATENT DOCUMENTS

| 2,427,962 A | 9/1947 | Gwinn |
| 2,497,127 A | 2/1950 | Lecarme |

(Continued)

FOREIGN PATENT DOCUMENTS

WO 9419238 A2 9/1994

OTHER PUBLICATIONS

Combined Search and Examination Report of the United Kingdom Patent Office in related UK Patent Appl. No. GB2013119.9, dated Mar. 26, 2021, 6 pages.

(Continued)

*Primary Examiner* — Peter M Poon
(74) *Attorney, Agent, or Firm* — Bochner PLLC; Andrew D. Bochner

(57) ABSTRACT

A pitch and roll control arrangement for controlling lateral and longitudinal orientation of an aircraft includes a handle (5110) positionable above a pilot's seat and shaped to be gripped by the pilot (10), an elongate connector (5112) extending in a generally forward direction from the handle to a forward joint and an elongate transverse arm (5114) extending transversely from the forward joint of the connector to a mounting location forward and to the side of the pilot in use. A mounting arrangement supports the transverse arm at the mounting location to permit the transverse arm to move laterally sideways and fore and aft as the handle is moved by the pilot. A control coupling provides at least one moving connection which moves in response to fore and aft movement and lateral movement of the handle for coupling to actuators of the aircraft.

14 Claims, 8 Drawing Sheets

(56) References Cited

U.S. PATENT DOCUMENTS

| | | | |
|---|---|---|---|
| 4,114,843 A | | 9/1978 | Robinson |
| 5,527,004 A | * | 6/1996 | Haggerty ............ B64C 13/0421 244/234 |
| 2009/0321584 A1 | | 12/2009 | Taylor |
| 2019/0263504 A1 | * | 8/2019 | Lavallee ............ B64C 13/0421 |

OTHER PUBLICATIONS

Examination Report of the United Kingdom Patent Office in related UK Patent Appl. No. GB2013119.9, dated Feb. 1, 2023, 4 pages.
Examination Report of the United Kingdom Patent Office in related UK Patent Appl. No. GB2013119.9, dated Aug. 16, 2023, 5 pages.
International Preliminary Report on Patentability of the International Searching Authority in relation to International Application No. PCT/GB2021/052178, dated Feb. 16, 2023, 8 pages.
International Search Report and Written Opinion of the International Searching Authority in relation to International Application No. PCT/GB2021/052178, dated Dec. 20, 2021, 4 pages.

* cited by examiner

AIRCRAFT CONTROL APPARATUS

FIELD OF THE INVENTION

The present application relates to control apparatus for aircraft, particularly to control pitch and roll of the aircraft. It is particularly useful in rotorcraft such as helicopters but is also useful in fixed wing aircraft.

BACKGROUND OF THE INVENTION

In a helicopter a joystick type control is typically used as the cyclic control to control blade pitch (not to be confused with the pitch of the aircraft) as the blades rotate, with forward and aft motion of the joystick (with respect to the pilot) causing the aircraft to pitch down or up and sideways motion causing corresponding roll. In a fixed wing aircraft a joystick may be used or a control wheel in which fore and aft movement causes pitching and the wheel is rotated for roll.

Many aircraft have dual controls, allowing two pilots the ability to control the aircraft. In helicopters the two pilots generally sit next to one another. In light dual-control aircraft, particularly helicopters, the second set of controls may be removable if not required during single pilot operation. For helicopters the pilot controls tend to be on the right-hand side of the cockpit, whilst the auxiliary (removable) controls tend of be on the left-hand side whereas for fixed wing the pilot controls are on the left.

In larger aircraft cockpits tend to be large and controls are generally substantially assisted with hydraulics or may be fly by wire and there are plenty of options for both placing and configuring the controls.

In lighter aircraft, the two sets of controls (for pilot and co-pilot) are generally mechanically linked both to each other and to the ultimate aircraft control actuators. This is generally the case even when (as is typically the case in a light helicopter, but less common in a light aircraft) the controls are assisted by hydraulic servos to reduce pilot load. Mechanically linking main (pilot) and auxiliary (co-pilot) controls together and to aircraft actuators limits options for positioning the controls, especially with very the tight weight and space constraints in small aircraft.

Traditionally, especially in smaller helicopters, cyclic control is provided by a substantially vertical control stick which extends up from the floor of the aircraft between the user's legs, which can be operated like a joystick. Such placement may make it difficult for the pilot (and co-pilot, in dual-control aircraft) to get into the seat (the joystick upright may have a curve in it to assist). In the floor of the helicopter a mechanism couples the two cyclic controls and drives control rods to the actuators.

The requirement for the upright stick and mechanism in the floor reduces downward visibility which is important in a helicopter and if a bird strikes from above or slightly below the controls may be impacted.

In the 1970s Robinson Helicopter Co. designed a 'T-bar' cyclic control stick, which could be used in dual-control aircraft. That design is described in U.S. Pat. No. 4,114,843. According to this 'T-bar' design a single, substantially vertical control stick is located near the centre of the aircraft directly between the pilot and co-pilot's seats, effectively next to where the pilot and co-pilot sit during flight. At its base the control stick is connected to conventional linkages that allow movement of the control stick to provide pitch and roll control for the helicopter. The control stick can move laterally and longitudinally, but cannot be twisted around its vertical axis. Freely hinged to the top of the control stick is a substantially horizontal crossbar extending laterally that can tilt in a vertical plane but not pivot about a vertical axis. The crossbar has two grips: one located directly in front of and above each of the pilot's and co-pilot's seats. The crossbar pivots so either the pilot or co-pilot can move their control stick to a convenient height to hold the grip. Whichever pilot uses the grip, forwards and backward motion of the grip translates to pitch motion of the aircraft and sideways movement of the grip translates to roll of the aircraft.

This overcomes some of the drawbacks of conventional joysticks. However getting in an out tends to need to be co-ordinated between pilots as one pilot enters lifting the T-bar and pushing the other end down into the other pilot seating position then the second pilot enters taking care not to push the depending grip inadvertently down into the groin of the now seated first pilot on raising the T bar to get in. This can cause some issues when vacating the aircraft in a hurry, for example in an emergency. In flight, in order to allow enough clearance for entry and exit the stick can generally only be at a convenient position for one pilot at a time to hold the control at a convenient position rest their arm. This therefore requires active handover of control by physically moving the stick and tilting the bar in a see-saw motion rather than the other pilot simply assuming control from controls that are naturally already to hand. During dual instruction in early stages the instructor may spend time with the stick in a less than optimal position actively following the control inputs of a student pilot or may be slowed reacting to errors. The T-bar takes up prominent space in the cockpit both limiting instrument position and other ergonomic considerations and is susceptible to inadvertent movement or a bird incursion.

As a modification of the T-bar, WO 94/19238 proposed an arrangement in which two joysticks are mounted on a transverse arm which then curves forward and back again with a hinge so two pilots can more readily control a Robinson arrangement simultaneously. However this can be cumbersome and can catch the knees of pilots when entering and exiting the aircraft.

SUMMARY OF THE INVENTION

Aspects of the invention are set out in the independent claims and preferable features are set out in the dependent claims.

There is described herein a pitch and roll control arrangement for controlling both lateral and longitudinal orientation of an aircraft having at least one pilot's seat, wherein the control arrangement comprises: a handle positionable substantially above the pilot's seat and shaped to be gripped by a pilot; an elongate connector that extends in a generally forward direction from the handle portion to a forward joint; an elongate transverse arm connected to the forward joint of the connector and extending in a generally transverse direction from the connector to a mounting location; a mounting arrangement configured to support the transverse arm at the mounting location to permit the transverse arm to move laterally sideways and fore and aft and to constrain the forward joint to move generally horizontally as the handle is moved fore and aft and laterally by the pilot; a control coupling associated with the mounting arrangement arranged to provide at least one moving connection which moves in response to fore and aft movement and lateral movement of the handle for coupling to actuators of the aircraft.

A particular advantage is the mounting arrangement is offset forward and to the side of the pilot, facilitating ingress and cabin layout. Preferably the elongate connector extends into a dash panel. Preferably the forward joint and preferably the transverse arm also are concealed within the forward panel or otherwise remote from the pilot's knees. Desirably the elongate connector extends forward so that the forward joint and transverse arm remain forward of the pilot's knees in use even with full aft movement of the handle. Preferably the transverse arm extends transversely from the forward joint without returning rearwards within the vicinity of the pilot's legs in use. This setup, with a control arrangement having a transverse portion mounted in front of the pilot's seat provides certain advantages over conventional joystick-like pitch control sticks, which are generally positioned extending upwards from the floor of the cockpit between the legs of the pilot, and over the tilting T-bar arrangement of the Robinson Helicopter Co. The pilot is provided with more room to enter and exit the aircraft because there is no control stick protruding from the floor. By placing the transverse portion forward of the pilot's seat there is more space around the pilot for controls, and also less risk of injury to the pilot in a collision situation. Compared to a joystick style handle positioned between the pilot's legs, the present arrangement allows a greater range of movement of the handle as the handle can pass over the pilot's knees during use and so its movement is not constrained by the pilot's legs. This allows greater control over the pitch and roll of the aircraft as the pilot can move the handle a larger amount to make a small adjustment. However the arrangement still allows pilots to control the pitch of the aircraft using lateral and fwd and aft movements of a handle, as they are used to from conventional control arrangements.

The transverse axis of the aircraft runs from the pilot's left to right in a piloted aircraft, and parallel to the wings of a winged aircraft. Thus the transverse axis of the aircraft is generally parallel to the floor of the aircraft (or floor of the cockpit) and goes from one side of the cockpit to the other. The generally transverse direction in which the elongate transverse arm extends is generally parallel to the transverse axis of the aircraft; in other words the length (or longitudinal axis) of the elongate transverse arm is generally parallel to the transverse axis of the aircraft.

The longitudinal axis of the aircraft runs from the tail, or back, of the aircraft to the nose, or front, of the aircraft. Herein, positions are described as forward (or fwd or fore) if they are closer to the nose of the aircraft and as backward (or aft) if they are closer to the tail of the aircraft. In other words, something position backward or aft would be behind in the forward travel direction. The upward and downward directions refer to directions are up and down from the viewpoint of the pilot sitting in the aircraft, or in other words are in a vertical direction when the aircraft is conventionally positioned on horizontal ground.

The connector may extend at an angle to the longitudinal axis of the transverse arm to allow the handle portion to be positioned behind, or to the aft of, the transverse arm. This means that although the transverse arm is located in front of the pilot's seat, the handle portion can be positioned above the pilot's seat and slightly in front of the back-support of the pilot's seat, such that it is in a convenient place to be held in the pilot's hand during flight.

The actuators of the aircraft comprise one or more actuators that each alter lateral and/or longitudinal orientation of the aircraft.

The transverse portion is generally mounted at a height above the level of the cockpit floor, preferably substantially above the level of the cockpit floor, such as at least 30 cm or at least 40 cm above the level of the cockpit floor.

The handle portion is preferably rigidly connected to the transverse portion via the connector portion, at least during flight. This allows movement of the handle portion to be transferred into movement of the transverse portion.

The elongate transverse arm is elongate, or longitudinal in shape—having one longitudinal dimension (or length), which is substantially larger than its cross-sectional dimension. The transverse portion is positioned transverse to the aircraft, such that it is in a substantially horizontal position during normal forward flight of the aircraft.

The translational movement of the transverse arm may be constrained to be substantially in a single plane parallel to the floor of the aircraft (i.e. a horizontal plane when the aircraft is in a conventional forward-flying position). Thus the transverse arm (and also the handle portion to which it is connected) can be moveable in the forward and back directions (fwd, or fore, and aft) and also in the lateral or side-to-side directions to alter the pitch and roll or longitudinal and lateral positioning of the aircraft, but is unable to move substantially up and down with respect to the floor of the aircraft (in the vertical direction when the aircraft is in a conventional forward-flying position). In some embodiments a small amount of vertical or up/down movement is permitted as the transverse arm moves forward and back, as connections between the transverse arm and the actuators (e.g. the control coupling) may require the movement to be slightly curved, or arced. For example the mounting arrangement may constrain the transverse arm to move not more than around 5 cm to 10 cm vertically.

Preferably the handle is movable upward and/or downward independently of the fore and aft movement and the lateral movement of the handle. This allows the handle to be repositioned to suit pilot comfort and/or to facilitate ingress or egress from the seat.

More specifically, the connector may be pivoted or otherwise movable such that it is rotatable about the longitudinal axis of the transverse portion. Essentially, rotating the connector portion upwards or downwards from a horizontal position would thus cause the end of the connector (and thus the handle) to move forward in the aircraft (towards the front of the aircraft).

Thus the connector (and any further or auxiliary connector), and connected handle, may be moved to allow easier access into and out of the seat for the pilot (and co-pilot/passenger) while entering or exiting the aircraft. This may also allow the position of the handle portion (e.g. height above the seat and distance from the back of the seat) to be adjusted to make the positioning of the handle portion customisable for each pilot/co-pilot independently of the other. This may improve the ergonomics and make controlling the aircraft more comfortable for different users (e.g. users of different heights or with different length arms).

The transverse arm is constrained such that it would remain in substantially the same place (in particular, in the same place vertically) while allowing the connector(s) and handle(s) attached thereto to move in an arc about the transverse arm. In some embodiments, although the transverse arm remains in the same place, the transverse arm may be configured to rotate with the connector(s). For example both the connector(s) and the transverse arm may be configured to rotate about the longitudinal axis of the transverse arm. In some embodiments the mounting arrangement comprises a connecting tube supported by one or more downwardly extending control rods; and the elongate transverse arm is rotatably fixed inside the connecting tube to allow it to rotate about is own axis.

The connector(s) may be pivotable, or rotatable, about the transverse arm in an arc of at least around 20 degrees, preferably at least around 40 degrees, more preferably at least around 80 degrees. The rotation of the connector portion about the transverse portion may be constrained to be less than 180 around degrees, preferably less than around 150 degrees, more preferably less than around 120 degrees, or even less than around 90 degrees.

The control arrangement may further comprise a stop arranged to prevent the handle moving below a lower stop point. The lower stop point may, for example, be between around 10 m and 50 cm above the height of the seat of the pilot's seat, preferably between around 15 cm and 40 cm above the height of the pilot's seat, or between around 20 cm and 35 cm above the top of the pilot's seat. Thus the downward stop may be arranged to support the weight of the handle and elongate arm and prevent the elongate arm rotating downwards and the handle dropping below the lower stop point.

In some embodiments the handle is counterbalanced, slightly spring loaded and/or damped to bias the handle return to a neutral or resting position after it has been moved up (e.g. for entry or egress to or from the aircraft). The counterbalance arrangement should allow movement of the handle up when moved in an upward direction with a reasonably force, such as 0.5N or 1N or 2N.

There may, for example, be a frictional element in the mounting arrangement that resists the motion of the handle in a downwards direction. The frictional element may resist the motion in a downwards direction when the handle returns downward to near or at or below the neutral resting position. Where the mounting arrangement comprises a connecting tube within which the elongate member is rotatably fixed, the frictional element may be provided within the connecting tube.

Optionally the forward joint comprises a hinge or pivot which couples fore and aft and lateral motion of the connector to the transverse arm but permits the handle to be raised or lowered substantially without moving the transverse arm.

Thus the connector and handle may be pivoted about the transverse arm.

Alternatively the forward joint may be substantially fixed (or the connector and transverse arm may be integrally formed) and the transverse arm may be permitted to rotate about its own longitudinal axis to accommodate vertical movement of the handle. The handle may be freely movable or may be biased towards or fixable at a particular height, for example by a friction fit.

The control coupling may provide a single moving connection which communicates fore and aft and lateral movement of the transverse arm, for example by both torsional and axial movement of a single control rod. Alternatively the control coupling may comprise a first moving connection which moves (substantially linearly, or torsionally) in response to a fore or aft movement of the transverse arm in order to move a first control rod and a second moving connection which moves (substantially linearly, or torsionally) in response to a lateral movement of the transverse arm.

The mounting arrangement may be positioned towards the outside of the aircraft (e.g. to the right or left side of the cockpit), but advantageously is positioned towards the centre of the aircraft. This is convenient in a small aircraft, even for a single pilot, but also allows a second auxiliary control (for a co-pilot) to be provided from the same mounting arrangement. In addition, in helicopters the actuators for controlling the helicopter movement are at the centre of the aircraft (rather than one of the sides), as this is where the rotor blades are connected. Positioning the mounting arrangement (and associated control coupling) towards the centre reduces the distance that needs to be covered by connectors coupling the pitch and roll control arrangement to the aircraft actuators.

The control arrangement may further comprise a lock configured to be moved between a locked configuration and an unlocked configuration, wherein: in the locked configuration the connector is secured such that it cannot be moved upward or downward; and in the unlocked configuration the connector is movable upward and/or downward.

Thus it may be possible for the connector to be repositioned prior to flight, e.g. to permit easy access for the pilot into/out of the aircraft and to adjust the position of the handle portion. Once the pilot is safely seated in the aircraft the lock may be moved to the locked configuration to prevent movement of the handle and connector around the transverse arm during flight. When locked the connector can be constrained to move with the transverse arm, e.g. only side-to-side (parallel to a transverse axis of the aircraft) and forwards and back (parallel to a longitudinal axis of the aircraft).

In some embodiments, a small amount of rotational movement of the connector about the transverse arm may be permitted in the locked configuration. This may improve the ergonomics of the handle positioning as the pilot (or co-pilot) moves the handle fwd and aft (or forwards and backwards), particularly where the transverse arm is constrained to move in a slight arc as it is pushed forward and backwards (for example due to the arrangement of rods and linkages connecting the transverse portion to the actuators). Thus in the locked configuration the connector may be constrained to rotate in an arc of not more than 15 degrees, preferably not more than 10 degrees or not more than 5 degrees about the transverse arm. Whereas in the unlocked configuration the connector(s) may be pivotable, or rotatable, about the transverse arm in an arc of at least around 20 degrees, preferably at least around 40 degrees, more preferably at least around 80 degrees. In the unlocked configuration the rotation of the connector about the transverse portion may be constrained to rotate in an arc that is less than 180 around degrees, preferably less than around 150 degrees, more preferably less than around 120 degrees, or even less than around 90 degrees.

Where there is an auxiliary or further connector, the further connector may have its own further lock to allow it to be secured and unsecured independently of the main connector, or the lock for the main connector may also act to secure and unsecure the auxiliary/further connector with respect to its pivoting/rotating arrangement about the transverse arm.

The mounting arrangement may comprise: two generally parallel support arms extending downwardly from spaced apart mounting points on the transverse arm to corresponding spaced apart mounts arranged to be secured to the aircraft structure, preferably around the floor, the mounts permitting the support arms to pivot fore and aft and laterally.

Preferably the support arms are at least 40 cm in length. In some embodiments the support arms are between 40 cm and 100 cm in length, more preferably between around 45 cm and 70 cm in length.

A first of the support arms may be configured to transmit fore and aft movement of the handle to the actuators of the aircraft and a second of the support arms may be configured to transmit lateral movement of the handle to the actuators of the aircraft.

The spaced apart mounting points on the transverse arm may be spaced around 5 cm apart. In some embodiments the spaced apart mounting points on the transverse arm are between around 1 cm and 10 cm apart, preferably between around 2 cm and 8 cm apart.

The support mounts arranged to be secured to the aircraft structure may be arranged such that the pivot points of the support arms are movable as the support arms are pivoted fore and aft and/or as the support arms are pivoted laterally.

In some embodiments the control arrangement further comprises: a further handle positionable substantially above a further pilot's seat; and a further elongate connector that extends in a generally forward direction from the handle portion to a further forward joint; and wherein the transverse arm extends beyond the mounting arrangement to the further forward joint.

For example, the connector portion may be connected at the forward joint to a first end of the transverse arm and the further/auxiliary connector may be connected at the further forward joint to a second, opposing end of the transverse arm.

In general the pilot's seat is located on the right hand side of the cockpit of a helicopter and the further seat for a co-pilot is located on the left hand side of the cockpit, although reverse arrangement (pilot's seat on left and co-pilot's seat on right) is also possible. Thus in the normal arrangement the connector may be connected to the right end of the transverse arm and the further connector may be connected to the right end of the transverse arm.

The further (or auxiliary) handle, and the further (or auxiliary connector), may be detachable, such that they can be removed on occasions when the aircraft is intended to be flown without a co-pilot. This improves ease of access to the co-pilot seat (which in such cases would be used as a passenger seat).

Preferably the handles may be independently raised and lowered. This is inherently provided when at least one forward joint comprises a hinge. If instead the transverse arm pivots (as discussed above) and thus both handles would move up and down in unison, then this still provides an advantage over the Robinson arrangement that both controls may be raised together for ingress or egress. A single hinge as one forward joint or a swivel in the arm in such a case may enable independent movement.

Another advantage of this arrangement is that the mounting arrangement can be protected and/or hidden in the aircraft panel.

The aircraft may have a panel, preferably an instrument panel, positioned forward of the pilot's seat, and wherein the elongate connector is shaped and sized to allow the mounting location to be forward of the panel while the handle is positioned substantially above the pilot's seat.

Thus the transverse portion of the pitch control arrangement may be enclosed, or at least partially or completely obscured or hidden by the panel. In other words, the mounting arrangement can be located substantially within, under or behind, a portion of the instrument panel and at least one connector extends into or under a portion of the instrument panel. "Behind" here means the other side of the panel compared to the pilot's seat. Instrument panels generally face rearwardly towards the pilot, so behind the panel in this context means more forward in the aircraft.

Positioning the transverse arm within/beneath the cockpit panelling can improve safety. For example, in the event of bird strike (e.g. through the front screen of the cockpit of the aircraft) the transverse arm may be protected by the panel and therefore may be less likely to be damaged or displaced by the strike. Damage or displacement of the part of the pitch and roll control arrangement that is coupled to the actuators could cause inappropriate controls to be effected in the actuators, which could result in unsafe changes in the pitch of the aircraft during flight. It also means that in the event of a collision the transverse arm is less likely to hit and injure the pilot.

In some embodiments the aircraft is a helicopter and the pitch and roll control arrangement is a cyclic controller. For example the actuators may be arranged to effect control of a swashplate of the helicopter. Thus in a helicopter the pitch and roll control arrangement can control the pitch and roll of the helicopter as the swashplate controls the pitch of the rotor blades in a helicopter. Where the control arrangement is for a fixed wing aircraft, such as an aeroplane, the actuators may be arranged to effect control of the ailerons and elevator of the aeroplane.

Preferably the mounting arrangement constrains the transverse arm to move between a back plane in the aircraft and a forward plane in the aircraft, wherein the back plane is at least 40 cm forward of the front of the seatback of the pilot's seat and wherein the forward plane is at least 50 cm forward of the front of the seatback of the pilot's seat.

The transverse arm is constrained such that it cannot travel further back in the aircraft than the back plane and cannot travel further forward in the aircraft than the forward plane. Generally the back plane will be not more than 150 cm forward of the front of the seatback of the pilot's seat and the forward plane will be not more than 180 cm forward of the front of the seatback of the pilot's seat. In preferred embodiments the back plane is between around 50 cm and 70 cm forward of the front of the seatback, such as around 60 cm. In preferred embodiments the forward plane is at least around 80 cm forward of the front of the seatback and/or not more than around 120 cm forward of the front of the seatback, such as around 90 cm forward of the front of the seatback. The back plane and forward plane are parallel to one another and separated a distance along the longitudinal (fwd/aft) axis of the aircraft. The back plane and the forward plane extend transversely across the aircraft and are vertical in normal forward flight of the aircraft.

The back plane may be at least 60 cm forward of the front of the seatback of the pilot's seat and wherein the forward plane is at least 70 cm forward of the front of the seatback of the pilot's seat.

The control coupling may comprise one or more rods and/or linkages for coupling the transverse arm to actuators of the aircraft.

Thus the transverse arm may be coupled to the actuators mechanically. In some embodiments hydraulic assistance is provided to the coupling to reduce the force required by the pilot. Parallel linkages may be used.

Preferably the actuators comprise a lateral actuator and a longitudinal actuator, and the transverse portion is coupled to the one or more actuators via: a first rod or arm coupled to a lateral actuator that controls the lateral orientation of the aircraft; and a second rod or arm coupled to a longitudinal actuator that controls the longitudinal orientation of the aircraft.

Preferably the first rod and the second rod extend in a generally downward direction from the transverse arm to a level beneath the floor of the cockpit of the aircraft.

There is also described herein: a pitch and roll control system for controlling lateral and longitudinal orientation of an aircraft having a pilot's seat, wherein the pitch and roll controller system comprises: a control arrangement substantially as described above; and one or more actuators that control the lateral and longitudinal orientation of the aircraft, wherein the one or more actuators are coupled to the transverse arm of the pitch and roll control arrangement such that movement of the transverse arm effects control of the one or more actuators during flight.

There is also described an aircraft having a pilot's seat, wherein the aircraft comprises: a pitch and roll control system substantially as described above.

The invention extends to an aircraft cockpit or portion thereof having such a pitch and roll control installed, optionally with a seat and rudder controls, and also to an instrument panel for an aircraft having provision for such a control.

There is also described herein: a light aircraft cockpit having an instrument panel, the cockpit comprising: a control arrangement substantially as described above; and wherein the mounting arrangement is located substantially within, under or behind a portion of the instrument panel and wherein at least one connector extends into or under a portion of the instrument panel.

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE FIGURES

Methods and systems for pitch and roll control in aircraft are described by way of example only, in relation to the Figures, wherein.

DETAILED DESCRIPTION

Example Aircraft

Figure 1A:
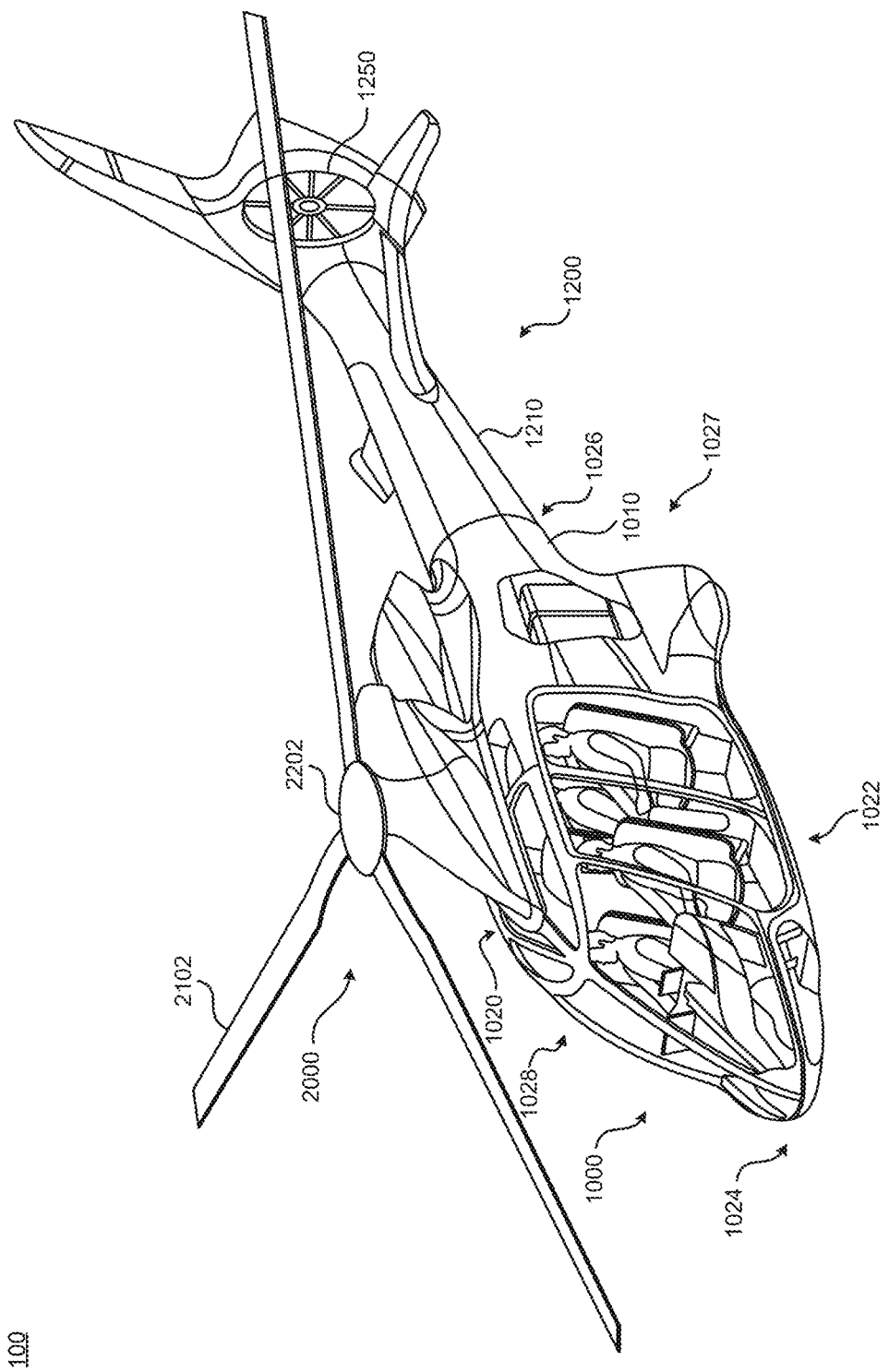
FIG. 1a shows a perspective view of an example aircraft, in particular a helicopter.
Figure 1B:
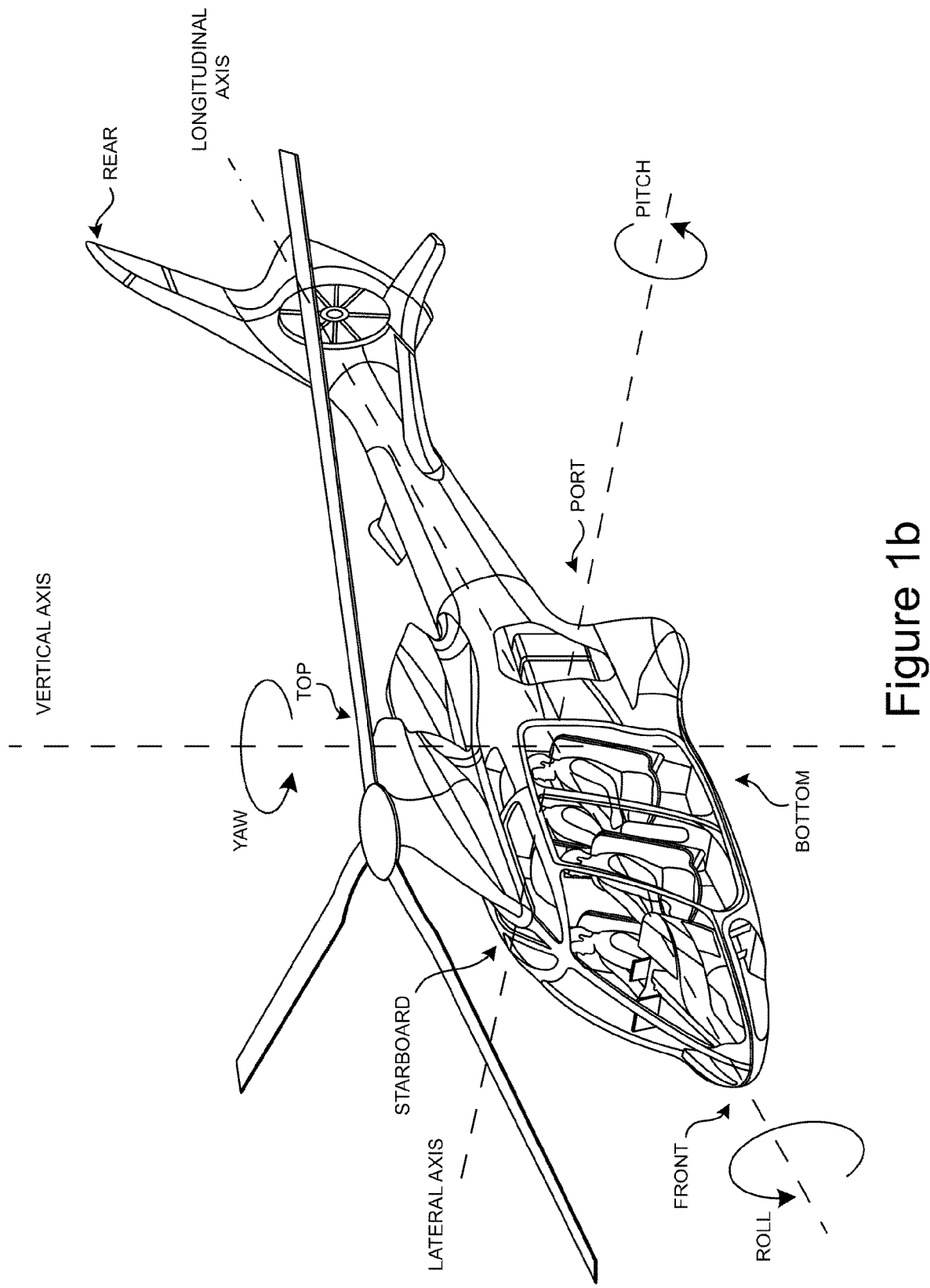
FIG. 1b shows the aircraft of FIG. 1a with reference to its turning axes.

Referring to FIGS. 1a and 1b, a helicopter 100 will now be described.

The helicopter 100 has an aerodynamic fuselage 1000, a tail boom assembly 1200, a main rotor assembly 2000, a power plant 3000 and a landing gear arrangement 4000. The fuselage 1000 comprises a shell 1010, where the shell 1010 defines a top 1020, bottom 1022, front 1024, rear 1026, left 1027 and right 1028 of the fuselage 1000. The fuselage 1000 also has a length 1002 from the front 1024 to the rear 1026, and a maximum width 1004.

Referring to FIG. 1b, the helicopter 100 has a front, rear, left, right, top and bottom. The left and right may alternatively be referred to as port and starboard respectively. The helicopter 100 has a longitudinal axis, a lateral axis and a vertical axis. The longitudinal axis extends between the front and the rear of the helicopter 100. The lateral axis extends between the left and the right of the helicopter 100. A direction parallel to the lateral axis is a transverse direction, and in forward flight is generally horizontal and perpendicular to the direction of forward travel. An outward direction is substantially parallel to the lateral axis and away from the longitudinal axis. An inward direction is substantially parallel to the lateral axis and towards the longitudinal axis. The vertical axis extends between the top and the bottom of the helicopter 100. In forward flight, the vertical axis is substantially vertical and perpendicular to the direction of forward travel.

Standard aeronautical terms aft and fwd are used. Aft or rearward is used here to mean towards the rear of the helicopter 100 or away from the direction of forward travel. Fwd, fore or forward, is used here to mean towards the front of the helicopter 100 or towards the direction of forward travel.

A first component forward of or in front of a second component is positioned closer to the front of the helicopter 100 along the longitudinal axis than the second component, although is not necessarily positioned on the longitudinal axis itself. Similarly, a first component backward of or behind a second component is positioned closer to the rear of the helicopter 100 along the longitudinal axis than the second component, although is not necessarily positioned on the longitudinal axis itself. A first component upward of or above a second component is positioned closer to the top of the helicopter 100 along, although not necessarily on, the vertical axis than the second component. Similarly, a first component below, beneath, under or downward of a second component is positioned closer to the bottom of the helicopter 100 along the vertical axis than the second component.

Pitch of the helicopter 100 is a rotation of the helicopter 100 about the lateral axis. Yaw of the helicopter 100 is a rotation of the helicopter 100 about the vertical axis. Roll of the helicopter 100 is a rotation of the helicopter 100 about the longitudinal axis.

The helicopter 100 has a centre of gravity (CoG) or centre of mass (CoM), defined as a point in 3-dimensional space about which the weight of the helicopter 100 applies no moment or torque. Optionally the centre of mass can be the intersection of the longitudinal, lateral and vertical axes. Rotor blades of the main rotor assembly have a centre of rotation in a plane of rotation at a rotor head location. The rotor head location can act as a datum location from which the location of other components of or positions in the helicopter 100 are referenced. The helicopter 100, when empty, may have a nominal centre of mass at a location longitudinally near to the rotor head location.

The helicopter 100 has landing gear (not shown) to support the helicopter 100 when on the ground. The landing gear may be fixed or retractable and may include skids or wheels. The landing gear provides a base for the helicopter 100 when on the ground, vertices of the base defined by points of contact between the landing gear and the ground.

Pitch Control in Helicopters

In helicopters a cyclic controller is used to control the mechanical pitch angle, or feathering, of the helicopter blades. The cyclic control is connected mechanically or electronically to actuators that cause the pitch of the rotor blades to change at different points in the blades' rotation to effect the control input by the pilot at the cyclic controller. In a hover, altering the pitch of the blades changes the movement of the helicopter forward, back, and laterally. In forward flight altering the pitch of the blades causes the helicopter to roll into a turn in a desired direction (lateral movement), or tilt the nose of the helicopter up and down (longitudinal movement), resulting in altitude changes (climbing or descending flight).

Pitch control in helicopters is transferred to the rotor blades via a swashplate arrangement, which generally comprises a stationary swashplate and a rotating swashplate. The stationary swashplate is tiltable in all directions and can move vertically. Actuators connected (mechanically or electronically) to the user controls cause the movement of the stationary swashplate. Where autopilot is available, the autopilot computer system can also control the actuators. The rotating swashplate is connected to the stationary swashplate such that up/down and tilting movements of the stationary swashplate are transferred to the rotating swashplate, and thence to the rotor blades.

Referring to FIG. 1*a* again, a pilot can provide cyclic and collective control inputs to control the helicopter 100 in flight. The main rotor assembly 2000 comprises rotor blades 2102 coupled to and configured to rotate with a central hub about an axis of rotation provided by a rotor mast extending from the top 1020 of the fuselage. The is hub enclosed by a rotor head fairing 2202. Each blade 2102 is configured to rotate at the root about its length so as to change its angle of attack. An upper swashplate and a lower swashplate are disposed about the mast and are arranged such that they collectively tilt and move up and down the mast. The upper swashplate rotates with the blades 2102 and has an upper control link coupled to each rotor blade 2102 to cause each rotor blade 2102 to twist about its length.

The lower swashplate is non-rotating and receives control input from the pilot's cyclic and collective controls, wherein a cyclic control input causes the lower swashplate to tilt and a collective control input causes the lower swashplate to move up or down the mast. Such tilting or movement is replicated in the upper swashplate, causing the angle of attack and therefore lift force generated by each blade 2102 to change. The tilt of the lower swashplate may also be described as a rotation of the lower swashplate about its lateral and longitudinal axes.

A cyclic input causes the swashplates to tilt, meaning the pitch of each blade 2102 varies as it rotates around the hub between a maximum at the azimuth corresponding to the highest point of the lower swashplate, and a minimum at the azimuth corresponding to the lowest point of the lower swashplate. By way of example, the pilot may provide a longitudinal cyclic input by moving a cyclic control towards the front (fwd) or the rear (aft) of the helicopter 100, thus tilting the swashplates causing the rotor blades 2102 to achieve a maximum lift when towards the rear or front respectively and a minimum lift when towards the front or rear respectively. This varies the fwd and aft movement of the helicopter 100 and induces a change in pitch of the front 1024 or nose of the helicopter 100 (downwards when moving fwd or forwards, upwards when moving aft or backwards). In forward flight, longitudinal cyclic control input can be used to adjust the forward speed and thus pitch of the helicopter 100. Similarly, a lateral cyclic input to the left 1027 or right 1028 tilts the swashplates laterally, causing the helicopter to move towards the left 1027 or right 1028. This induces roll, i.e. rotation about a longitudinal axis of the helicopter 100, to the left 1027 or right 1028.

A collective input provides a uniform change in pitch for all of the blades 2102, resulting in an overall change in lift for the helicopter 100. In a hover or level flight, an increased collective input therefore causes the helicopter 100 to climb vertically or upwards, and a decreased collective input causes the helicopter 100 to descend vertically or downwards. In pitched (forward) flight, a collective input can be used to vary the speed of the helicopter 100 without varying the pitch of the helicopter 100, but will induce an ascent or descent.

Further, anti-torque control input provided by the pilot, typically via left and right pedals, controls the angle of attack of tail rotor blades in the tail rotor assembly 1200. This varies the torque applied by a tail rotor 1250, so can be used to adjust the yaw or yaw rate (i.e. the bearing direction) of the helicopter 100 in hover. In forward flight, an anti-torque control input varies the side-slip angle of the helicopter 100, i.e. the angle between the direction of travel and the heading of the helicopter 100. Cyclic, collective and anti-torque controls can be used in any combination to achieve a range of manoeuvres and flying conditions.

Figure 2:
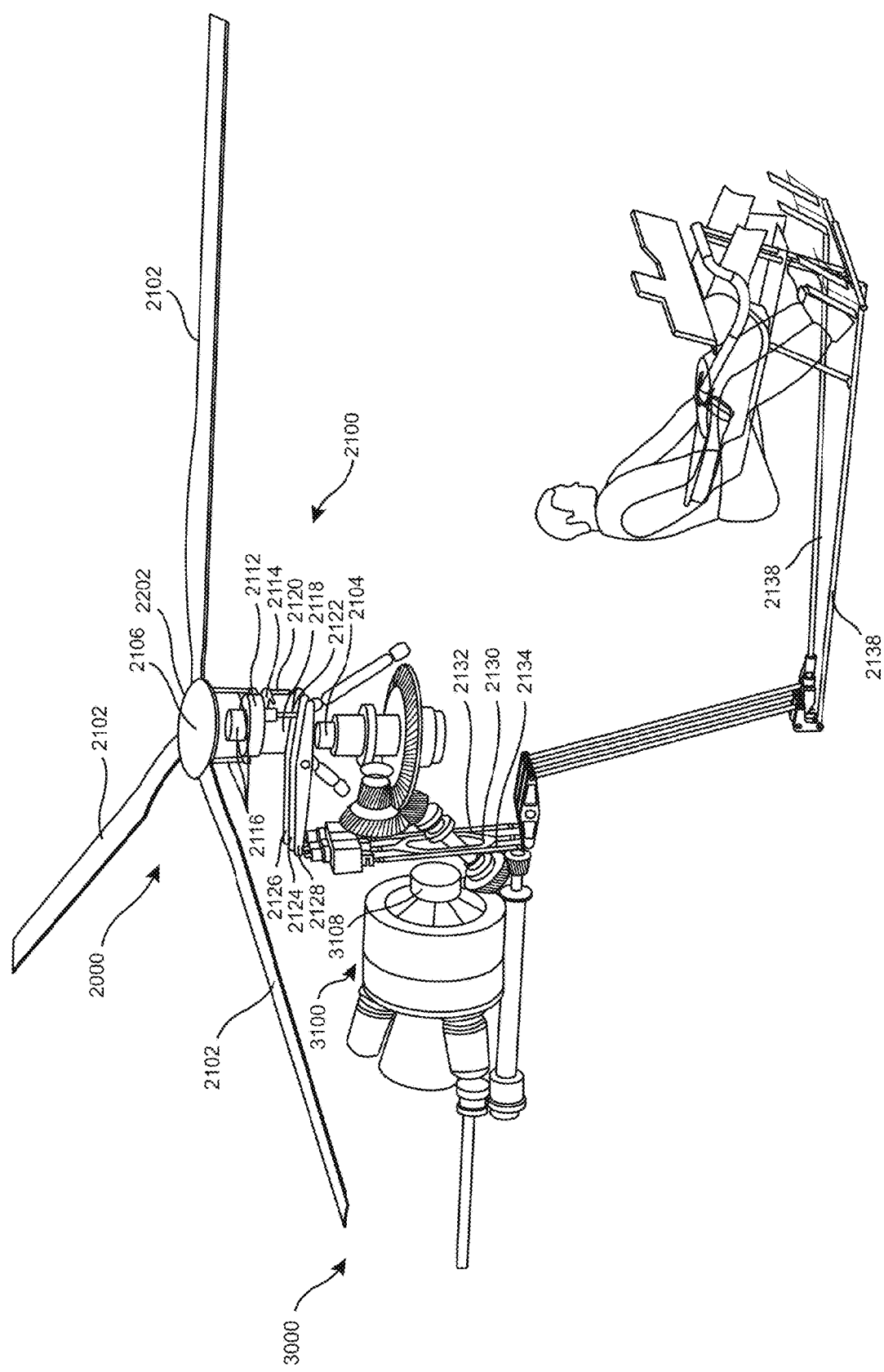
FIG. 2 shows an example pitch and roll control system for an aircraft, in particular a helicopter.

Referring to FIG. 2, a control system for a helicopter will now be described. This control system may be used in the helicopter 100 of FIGS. 1*a* and 1*b*.

The main rotor assembly 2000 comprises a rotor control assembly 2100, which includes the mechanical components for translating the input from a main rotor gearbox into rotation of the blades 2102, and the rotor fairing assembly 2200 which provides protection to the rotor control assembly 2100.

The rotor control assembly 2100 comprises at least two blades 2102. In this embodiment the rotor control assembly 2000 comprises three blades 2102. The blades 2102 are positioned at equal spacing (i.e. 120° apart) around the rotor mast 2104 so that the thrust vector is stable.

The blades 2102 are connected to the rotor hub 2106. In this embodiment, the rotor control assembly 2100 comprises a "fully articulated" structure, which is a known structure in helicopter dynamics, comprising a flapping hinge and a lead-lag hinge.

The rotor hub 2106 is mounted onto the top end of the rotor mast 2104. The rotation of the rotor mast 2104 is therefore directly inputted into the rotor hub 2106 and consequently the blades 2102.

Upper control links 2116 are connected at a first end to the rotor hub 2016. The number of upper control links 2116 is determined by the number of blades 2102, therefore, in this embodiment, the number of upper control links 2116 is three. In this embodiment, the rotor hub 2106 comprises a strap arrangement in which the rotor hub straps 2108 wrap over rotor hub bars 2110. The upper control links 2116 connect to the rotor hub straps 2108 and the input from the upper control links 2116, either up or down, causes the strap to twist the rotor hub bars 2110. As the rotor hub bars 2110 are connected to the blades 2102, the twisting of the rotor hub bars 2110 causes the blades 2102 to twist.

The upper control links 2116 are connected at a second end to the swashplate arrangement, specifically, to the upper swashplate 2112. In this embodiment, the three upper control links 2112 are positioned at equal spacing (120° apart) around the rotor mast 2104 so that the upper control links 2112 align with a part of the blades 2102.

The upper swashplate 2112 rests upon the lower swashplate 2114. The swashplate arrangement 2112, 2114 is free to move vertically up or down (due to collective input), and tilt around the rotor mast 2104 (due to cyclic input). The input from the swashplate arrangement 2112, 2114 can cause the upper control links 2116 to move vertically. If the swashplate 2112, 2114 moves purely vertically then all the upper control links 2116 will move cooperatively. If the swashplate 2112, 2114 tilts then upper control links 2116 will move in different directions. The further the upper control link 2116 moves, the further the connected blade 2102 tilts. If the blade 2102 is tilted up, then the angle of attack increases which can result in an increase in lift coefficient.

The difference in blade 2102 angle of attack at different azimuthal positions can enable the helicopter 100 to direct the thrust in a tilted direction, and this enables the helicopter 100 to move in a different direction other than vertically (due to cyclic input).

Similar reasoning can be applied if the swashplate 2112, 2114 is moved vertically without tilting the angle. If the swashplate 2112, 2114 is raised vertically then the angle of attack on all blades 2102 will increase by the same amount resulting in an increase in lift (due to collective input).

The rotor control assembly 2100 also comprises at least one lower control link(s) connected at a first end to the lower swashplate 2114. In the illustrated embodiment, three lower control links 2118, 2120, 2122 provide the input into the lower swashplate 2114 either to move the swashplate 2112, 2114 vertically or to tilt the angle, as mentioned above. In this embodiment, the lower control link 2118, 2120, 2122 can only move vertically. The lower control link 2118, 2120, 2122 can move cooperatively to move the swashplate 2112, 2114 vertically or move by different amounts to tilt the swashplate 2112, 2114.

The lower control links 2118, 2120, 2122 are connected at a second end to corresponding control arms 2124, 2126, 2128. The control arms 2124, 2126, 2128 provide the input into the lower control links 2118, 2120, 2122 by moving the second end of the lower control links 2118, 2120, 2122 vertically.

The control arms 2124, 2126, 2128 are connected at a second end to control bars 2130, 2132, 2134. The control bars 2130, 2132, 2134 provide the input into the control arms 2124, 2126, 2128 by moving the second end of the control arms 2124, 2126, 2128 vertically.

The control bars 2130, 2132, 2134 are connected at a second end to at least one pilot input lever 2138, through which pilot input is transferred to the rotor mast actuators to control collective and cyclic pitch of the helicopter blades.

Pitch and Roll Control in Fixed-Wing Aircraft

In fixed-wing aircraft pitch control generally refers to changes in front-to-back tilt, which can be controlled by elevators on the aircraft. Roll refers to side-to-side tilting of the aircraft caused by adjustments to the ailerons, which make the aircraft to be tilt downwards on one side to cause the aircraft to turn in one direction or the other. Roll and pitch are traditionally controlled by a single stick, or joystick, controller, which can be positioned coming up from the floor of the aircraft, either between the pilot's legs or next to the pilot's seat.

Fly-by-Wire (FBW) and Manual Control Aircraft

'Fly-by-wire' aircraft exist, in which instead of manual controls, an electronic interface is used. In 'fly-by-wire' aircraft there does not need to be a mechanical connection between the controls with which the user/pilot interacts and the actuators on the aircraft because electric signals are derived from the pilot input in the controls and thus control instructions are transmitted electronically to the actuators. Therefore the pitch and roll controller (the cyclic, or cyclic stick, in helicopters) may be mounted to the side of the pilot's seat.

The pitch and roll arrangements described herein are particularly useful for aircraft with manual flight control as the need for a mechanical connection (or linkages) between the input controls and the actuators restricts the position of the controller.

Pilot Control Arrangement

Figure 3:
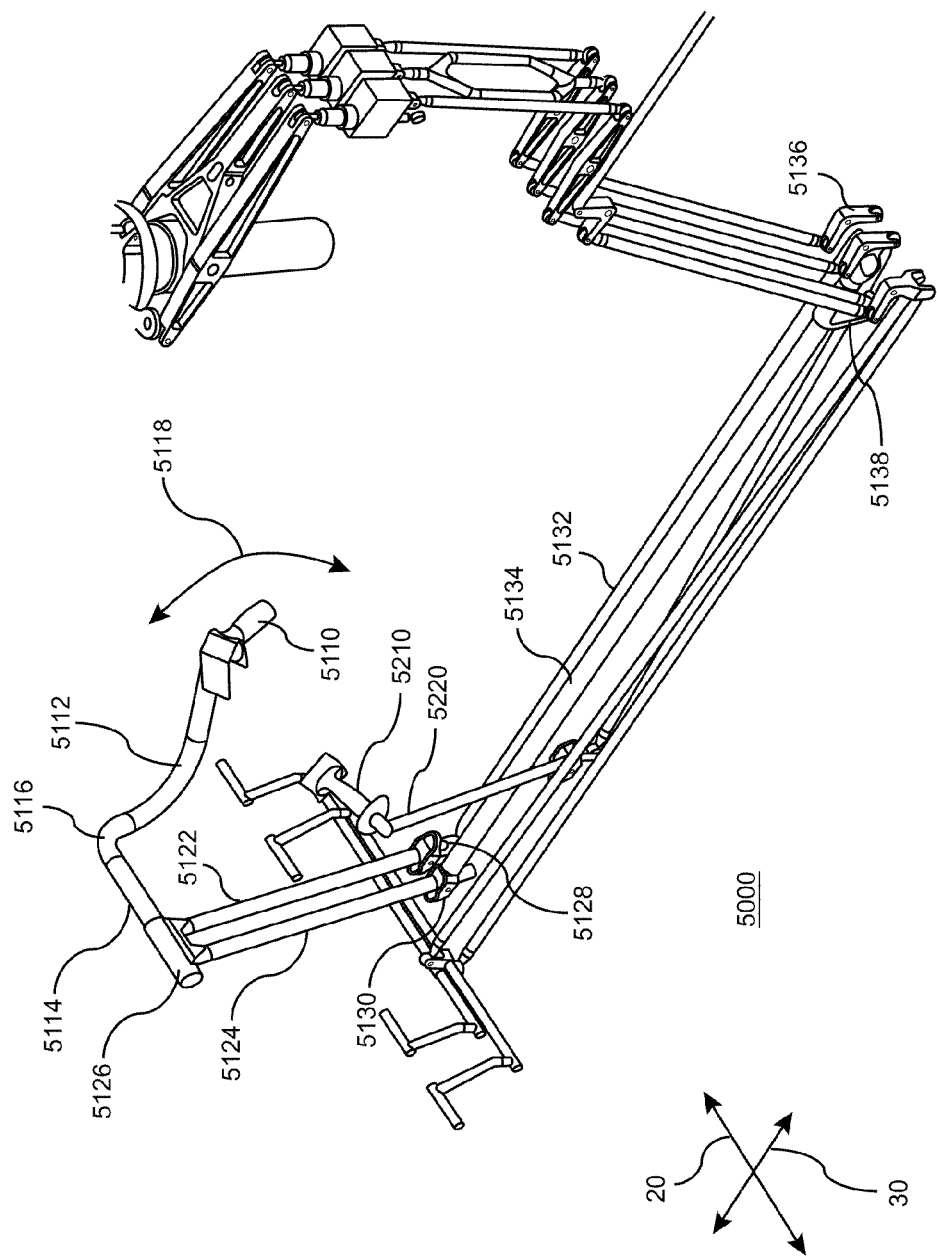
FIG. 3 shows an example pilot control arrangement from an above perspective view.

Referring to FIG. 3, a pilot control arrangement 5000 for an aircraft that can be used for receiving pilot input will now be described. The pilot control arrangement 5000 of FIG. 3 may be used in the control system shown in FIG. 2. A first arrow 20 marks the lateral, or transverse direction across the aircraft (side-to-side across the aircraft, if one is facing the direction of normal, forward motion of the aircraft). A second arrow 30 shows longitudinal, or front/back (fore/aft) direction in the reference frame of the aircraft.

The pilot control arrangement 5000 comprises a cyclic handle 5110 arranged to be held by a pilot. The cyclic handle 5110 can be moved by the pilot to control pitch and roll (longitudinal and lateral positioning) of the aircraft. The cyclic handle 5110 is attached to an elongate connector portion 5112 that extends generally forward (or in the fore, or fwd direction) from the cyclic handle 5110. The elongate connector portion 5112 has a distal end at its most forward point in the aircraft. The elongate connection portion 5112 is connected to an elongate transverse arm 5114 that extends transversely across the aircraft. The cyclic handle 5110, elongate connector 5112 and transverse arm 5114 may be integrally formed of a single piece of material, or may be formed of separate parts fixed together.

As can be seen, the elongate connector portion 5112 is generally horizontal with respect to the reference frame of the aircraft, however it has a slight curvature. This has been found helpful in allowing mounting of the transverse arm 5114 behind (or forward of, in the reference frame of the aircraft) the instrument panel.

The transverse arm 5114 is coupled to aircraft actuators that control pitch and roll of the aircraft. The transverse arm 5114 is coupled to these aircraft actuators by a first support arm 5122 for transmitting pitch (longitudinal orientation) control commands to aircraft actuators. The transverse arm 5114 is also coupled to a second support arm 5124 for transmitting roll (lateral orientation) control commands to aircraft actuators.

The longitudinal orientation (or pitch) of the aircraft can be controlled by moving the cyclic handle 5110 forwards and back (in direction marked by arrow 20). Moving the cyclic handle 5110 forwards causes the aircraft to pitch forwards, or in other words brings the nose of the aircraft down compared to the tail. Moving the cyclic handle 5110 backwards causes the aircraft to pitch backwards, or in other words brings the nose of the aircraft up compared to the tail. This can be used to control speed or elevation of the aircraft.

The lateral orientation (or roll) of the aircraft can be controlled by moving the cyclic handle 5110 from side to side (in direction marked by arrow 30). Moving the cyclic handle 5110 right causes the aircraft to tilt towards the right and moving the cyclic handle 5110 left causes the aircraft to tilt towards the left. This can be used to control turning of the aircraft.

The elongate connector 5112 is coupled to the transverse arm 5114 such that it can be rotated around the longitudinal axis of the transverse arm 5114. In this case the elongate transverse arm 5114 is rigidly coupled to the elongate connector 5112 and is capable of rotating about its own longitudinal axis, such that the transverse arm 5114 rotates with the elongate connector 5112. However in alternative embodiments the transverse arm 5114 may be fixed or mounted such that it is not rotatable about its longitudinal axis and the coupling between the elongate transverse arm 5114 and the elongate connector 5112, e.g. at the forward joint 5116, allows the elongate connector to pivot about the elongate transverse arm 5114

This allows the cyclic handle 5110 to be moved up and down in a generally arced shape, shown by a third arrow 5118 in FIG. 3. Advantageously, this allows the cyclic handle 5118 to be moved substantially upwards to provide room for a pilot to enter or exit the aircraft. It also allows small adjustments in the height of the cyclic handle 5118 to be made to compensate for pilots of different heights or with different length arms so the cyclic handle 5118 is positioned at a comfortable position for the pilot to grip it during flight.

The elongate connector 5112 is rotatable through an arc of about 60 degrees. The cyclic handle 5110 has a vertical displacement of around 40 cm from its lowest position to its highest position.

The pilot control system 5000 also comprises a collective handle 5210. The collective handle 5210 is coupled to one or more actuators that control pitch of all the blades of the aircraft (helicopter) at the same rate independent of their rotational position to control the lift force. Control of the collective pitch of the blades can allow the pilot to control the helicopter to hover, or descend or ascend vertically, for example. The collective handle 5210 is coupled to the actuator(s) for collective pitch control via a third support arm 5220 for transmitting collective control commands to aircraft actuators.

Figure 4:
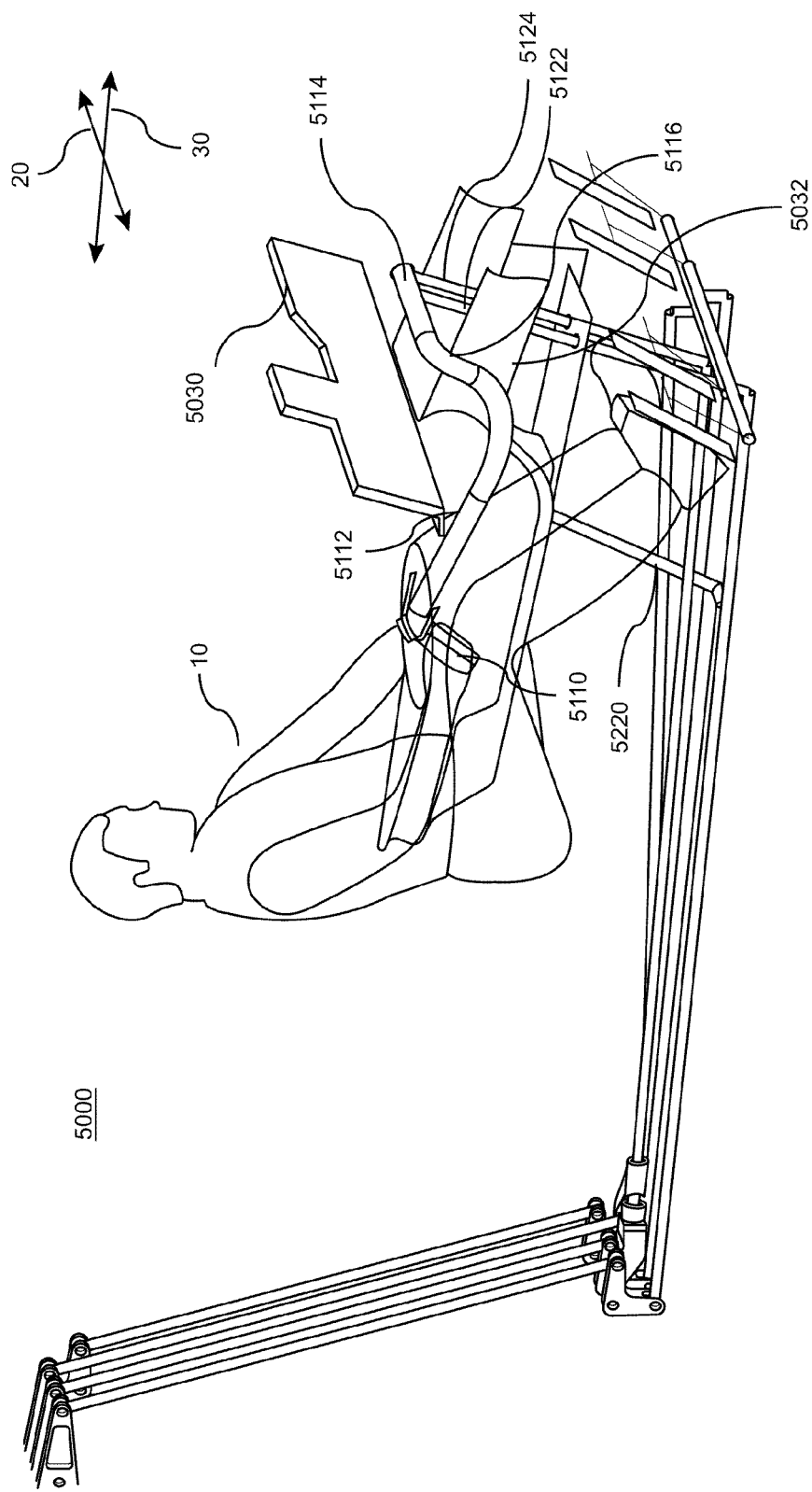
FIG. 4 shows an example pilot control arrangement from a side view.
Figure 5:
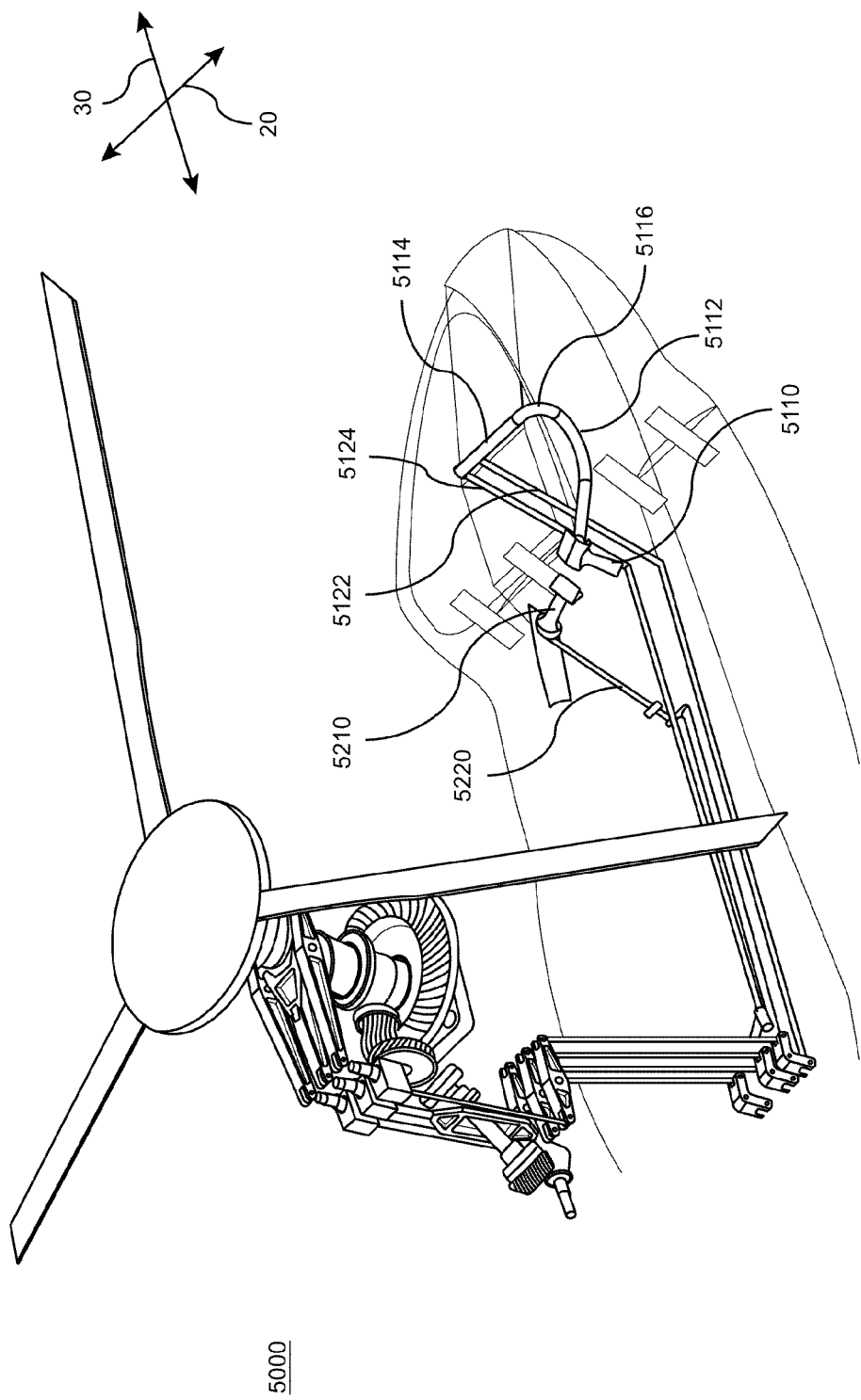
FIG. 5 shows an example pilot control arrangement positioned in a helicopter from an above perspective view.

FIG. 4 shows a pilot 10 seated within the cockpit of an aircraft (for example the helicopter 100 described above), which has the pilot control arrangement 5000 of FIG. 3 installed. The full cockpit is not shown in FIG. 4. FIG. 5 shows a view of the pilot control arrangement 5000 of FIGS. 3 and 4 in the body of the helicopter 100 from a different angle.

As can be seen, the pilot 10 is shown in a seated position, as they would be during flight; the pilot's seat is not shown in FIG. 4. The cockpit of the aircraft comprises an instrument panel 5030 located in front of the pilot 10. Behind the instrument panel 5030 (or forward of the instrument panel 5030 from the reference frame of the helicopter 100) is auxiliary panelling 5032 that encloses certain parts of the aircraft that do not need to be accessible during normal use, such as mechanical connectors and electronics for the aircraft.

When the pilot 10 is seated the cyclic handle 5110 is located above the lap of the pilot 10 (above the pilot's seat and slightly in front of the back of the seat, or seatback) such that it can be easily gripped by the pilot 10. The cyclic handle 5110 is attached to the elongate connector 5112, which extends forward from the cyclic handle 5110 (i.e. towards the front of the aircraft). In this case the elongate connector 5112 has a slight curve (viewed better from FIG. 5). The radius of curvature of the elongate connector 5112 is about 60 cm. Thus the elongate connector curves outwards towards the side of the aircraft (again, shown more clearly in FIG. 5), and also slightly downwards from the cyclic handle 5110. This allows the elongate connector 5112 to extend beside and behind the instrument panel 5030, whilst allowing the pilot 10 to grip the cyclic handle 5110 comfortably in front of their body. By "behind the instrument panel" we mean further forward in the aircraft (towards the front, or nose of the aircraft) than the instrument panel. From the viewpoint of the pilot 10, this will be behind the instrument panel.

The length of the elongate connector 5112 is around 50 cm. At the opposite end of the elongate connector 5112 from the cyclic handle 5110 is a forward joint 5116. The elongate connector 5112 is sized so that the forward joint 5116 is substantially further forward in the aircraft than the cyclic handle 5110. The forward joint 5116 curves inwards, towards the centre-line of the aircraft. Here, the forward joint 5116 also curves slightly upwards (this can be seen more clearly in FIG. 5). The forward joint 5116 is a rotating joint, such that the cyclic handle 5110 can freely rotate vertically about the elongate transverse arm 5114 without affecting the helicopter's attitude.

The forward joint 5116 extends through an aperture in the auxiliary panelling 5032 (some of the panelling in FIG. 4 is shown cutaway to allow view of the key components).

Attached to the forward joint 5116 is the elongate transverse arm 5114. The elongate transverse arm 5114 is positioned horizontally and transversely across the aircraft (sideways compared to the normal direction of travel). Thus the elongate transverse arm 5114 is parallel to the first arrow 20 that marks the lateral, or transverse direction across the aircraft. The elongate transverse arm 5114 is mounted behind (or forward in the aircraft of) the instrument panel 5030. The transverse arm is also enclosed from the side by the auxiliary panelling 5032. Providing the transverse arm 5114 behind panelling, such as the instrument panel 5030 and/or auxiliary panelling 5032, reduces the risk of injury to the pilot 10 or passengers through impact with the transverse arm 5114 in the event of a collision. It also means the transverse arm 5114 is less susceptible to damage in the event of a strike on the aircraft, such as a bird strike.

The elongate transverse arm 5114 is mounted such that it is movable forward and back and side to side. However the elongate transverse arm 5114 cannot move substantially in a vertical direction.

The elongate connector 5112, forward joint 5116 and transverse arm 5114 are rigidly connected such that movement of the cyclic handle 5110 (e.g. by the pilot 10) in a substantially horizontal plane is transmitted to the transverse arm 5114. Moving the cyclic handle 5110 forward and back (fore and aft) in the aircraft causes the elongate transverse arm 5114 to move forward and back. Moving the cyclic handle 5110 from side to side (transversely, or laterally) in the aircraft causes the elongate transverse arm 5114 to move from side to side.

The elongate transverse arm 5114 is movably mounted at a height of around 50 cm above the floor of the cockpit. The elongate transverse arm 5114 is constrained to move in a substantially horizontal plane (in the frame of reference of the aircraft). Thus the elongate transverse arm 5114 can move from side to side and backwards and forwards, but its height above the floor of the cockpit does not change substantially (e.g. not more than 2-4 cm).

At its most forward positions the elongate transverse arm 5114 is around 90 cm forward of the base of the seatback of the pilot's seat. At its most backward positions the elongate transverse arm 5114 is around 60 cm forward of the base of the seatback of the pilot's seat. The reason these are referred to as positions is that the transverse range of movement of the elongate transverse arm 5114 means it can be positioned in a range of transversely separated positions at the most forwards and most backwards point of its travel.

As explained above, the elongate transverse arm 5114 is coupled to a first support arm 5122, or control rod, which transmits longitudinal (or fore and aft) movement of the transverse arm 5114 to one or more actuators that control the pitch, or longitudinal angle of the aircraft, e.g. to bring the nose up or down. The elongate transverse arm 5114 is also coupled to a second support arm 5124, or control rod, which transmits lateral (transverse, or side to side) movement of the transverse arm 5114 to one or more actuators that control the roll, or lateral angle of the aircraft, e.g. to tilt the aircraft to one side or the other.

The first support arm 5122 and second support arm 5124 extend generally vertically downwards from the elongate transverse arm 5114. The first support arm 5122 and the second support arm 5124 are connected to the elongate transverse arm 5114 by a connector tube 5126. The first support arm 5122 and the second support arm 5124 constrain the movement of the elongate transverse arm 5114 in a generally horizontal plane. The end of the elongate transverse arm 5114 closest to the centre of the cockpit (in this case the left end) is rotatably fixed inside the connector tube 5126.

If a second cyclic handle is provided for a co-pilot, a further elongate transverse arm connected to the second cyclic handle can also be rotatably fixed within the connector tube 5126, extending towards the other side of the cockpit (in this case the right hand side). Preferably the two transverse arms are independently fixed within the connector tube 5126 so that both cyclic handles can operate at different working heights.

The top or upper ends of first support arm 5122 and second support arm 5124 are attached to the connector tube 5126 at points transversely spaced apart from one another by a small amount, in this case 5 cm. The first support arm 5122 and second support arm 5124 are control rods, having a rod shape. The first support arm 5122 and second support arm 5124 are elongate members with a length of around 55 cm.

The top ends of each of the first support arm 5122 and second support arm 5124 are in this case hingedly coupled to the elongate transverse arm 5114 by being connected at transversely spaced apart points on the connector tube 5126. The connection between the top ends of each of the first support arm 5122 and second support arm 5124 is a hinged connection that allows pivoting of each of the first support arm 5122 and the second support arm 5124 about corresponding axes parallel to the longitudinal axis of the aircraft (i.e. an axis parallel to second arrow 30 shown in FIG. 4). Thus the angle between the transverse arm 5114 and the first support arm 5122 and the second support arm 5124 changes as the transverse arm 5144 moves from side-to-side. The first support arm 5122 and second support arm 5124 act as parallel motion control rods, staying substantially parallel to each other as they move. However in this case the hinged coupling does not allow pivoting about the longitudinal axis of the transverse arm 5114 (i.e. pivoting about an axis parallel to the first arrow 20). Therefore as the transverse arm 5114 moves forward and backwards in the aircraft, it moves in a slight arc, constrained by the bottom ends of the first support arm 5122 and the second support arm 5124 being positioned below the floor of the cockpit. This means the elongate transverse arm 5114 does move slightly vertically as it moves back and forward in the aircraft. However the arc of this movement has a large radius, so the vertical displacement is no more than a few cm.

The lower or bottom ends of each of the first support arm 5122 and second support arm 5124 extend beneath the floor of the cockpit. Towards their bottom ends the first support arm 5122 is attached to a first support plate 5128 and the second support arm 5124 is attached to a second support plate 5130. The joints between the first and second support arms 5122, 5124 and the first and second support plates 5128, 5130 are pin joints that allow rotation of the support arms about an axis transverse to the aircraft (parallel to arrow 20) that passes through the joints. This means the transverse arm 5114 and thus the cyclic handle 5110 are free to move fore/aft in the cockpit. The support plates 5128, 5130 are mounted to the fuselage structure of the aircraft on spherical bearing joints, meaning that the bottom ends of the support arms 5122, 5124 can rotate about longitudinal axes (parallel to the direction of arrow 30) so that the elongate transverse arm 5114 and thus the cyclic handle 5110 is also free to move left/right.

The first (right hand) support arm 5122 is attached to one end of a pitch control push/pull rod 5132, which transmits longitudinal motion towards the mid section of the aircraft. At the other end the pitch control push/pull rod 5132 is attached to a bell crank 5136 to transmit motion upwards via a push/pull rod and into a control lever and thence to another push/pull rod which is then terminated at pitch control servo to control pitch of the aircraft.

The second (left hand) support arm 5124 is attached to one end of a torque tube 5134, which transmits rotary motion towards the mid section of the aircraft. At the other end the torque tube 5134 is attached to a crank arm 5138 to transmit motion upwards via a push/pull rod and into a control lever. This control lever is attached to another push/pull rod which is then terminated at a roll control servo to control roll of the aircraft.

Positioning of the Pilot Control Arrangement in the Aircraft Cabin

Figure 6:
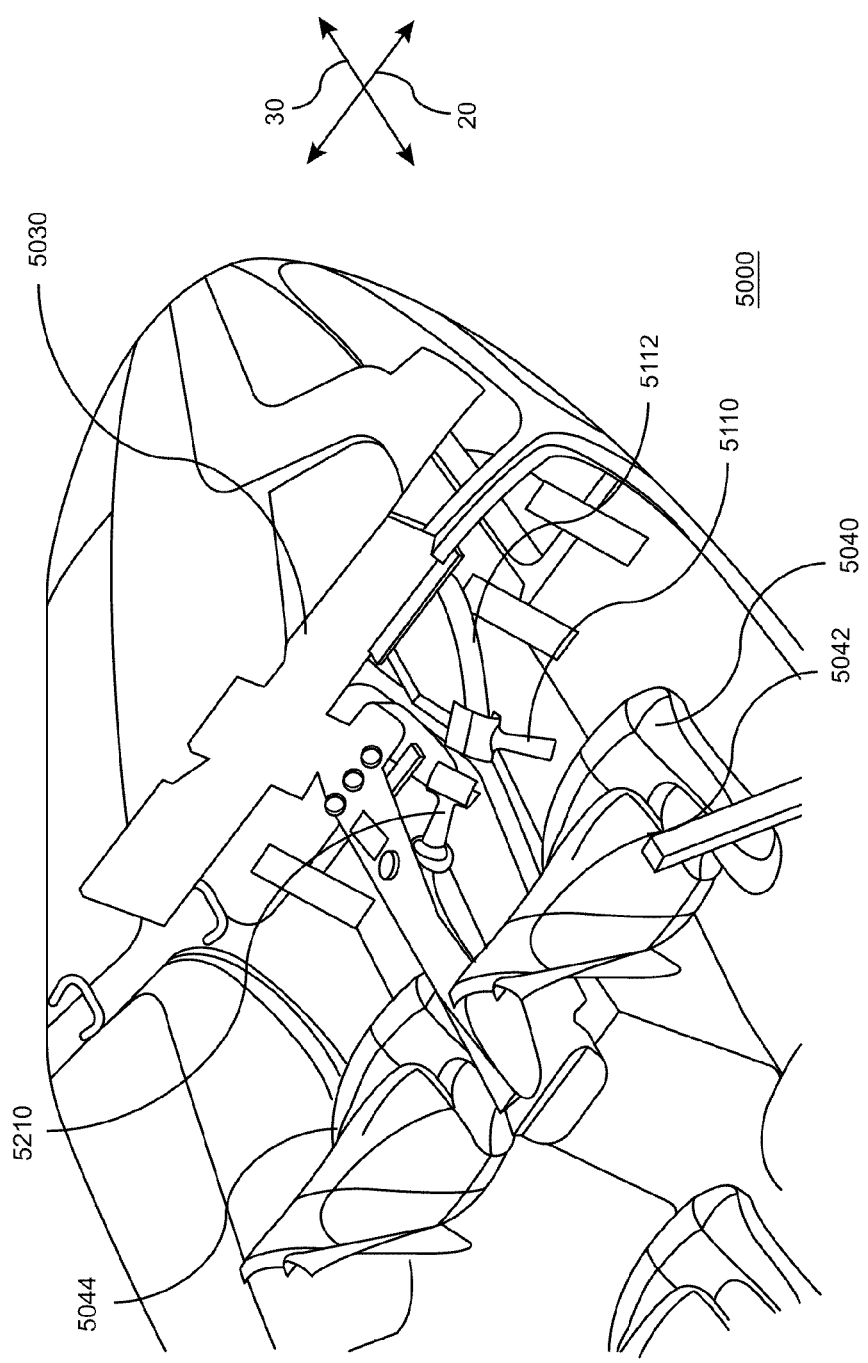
FIG. 6 shows an example helicopter cabin having a pilot control arrangement from an above perspective view.

FIG. 6 shows the pilot control arrangement 5000 of FIGS. 3 to 5 installed in an aircraft cabin, for example the cabin of helicopter 100.

A pilot's seat 5040 is located on the right hand side of the cabin, backward of the instrument panel 5030. The pilot's seat 5040 has a seatback 5042 at the back of the seat.

As can be seen, the cyclic handle 5110 is positioned above the pilot's seat 5040 and in front of the seatback 5042. The cyclic handle 5110 is about 40 cm in front the seatback 5042 of the pilot's seat 5040.

The elongate connector 5112 extends forwards from the cyclic handle 5110 and is curved slightly out towards the side (right) of the cabin and downwards, such that it passes under the instrument panel 5030. As can be seen from FIG. 6, the transverse arm 5114 is obscured from the pilot's view by the instrument panel 5030.

The cyclic handle 5110 extends down from the elongate connector 5112. In this example the cyclic handle 5110 can be seen to extend downwards from the elongate connector at an angle slightly towards the right. This means the cyclic handle 5110 is in an ergonomic position that allows the pilot to grip it easily with their right hand.

The collective handle 5210 can be seen to the left of the pilot's seat 5040, such that it can be gripped by the pilot's left hand.

A second seat 5044, for a co-pilot or passenger is located adjacent the pilot's seat 5040, on the left hand side of the cabin, to the left of the collective handle 5210.

Figure 7:
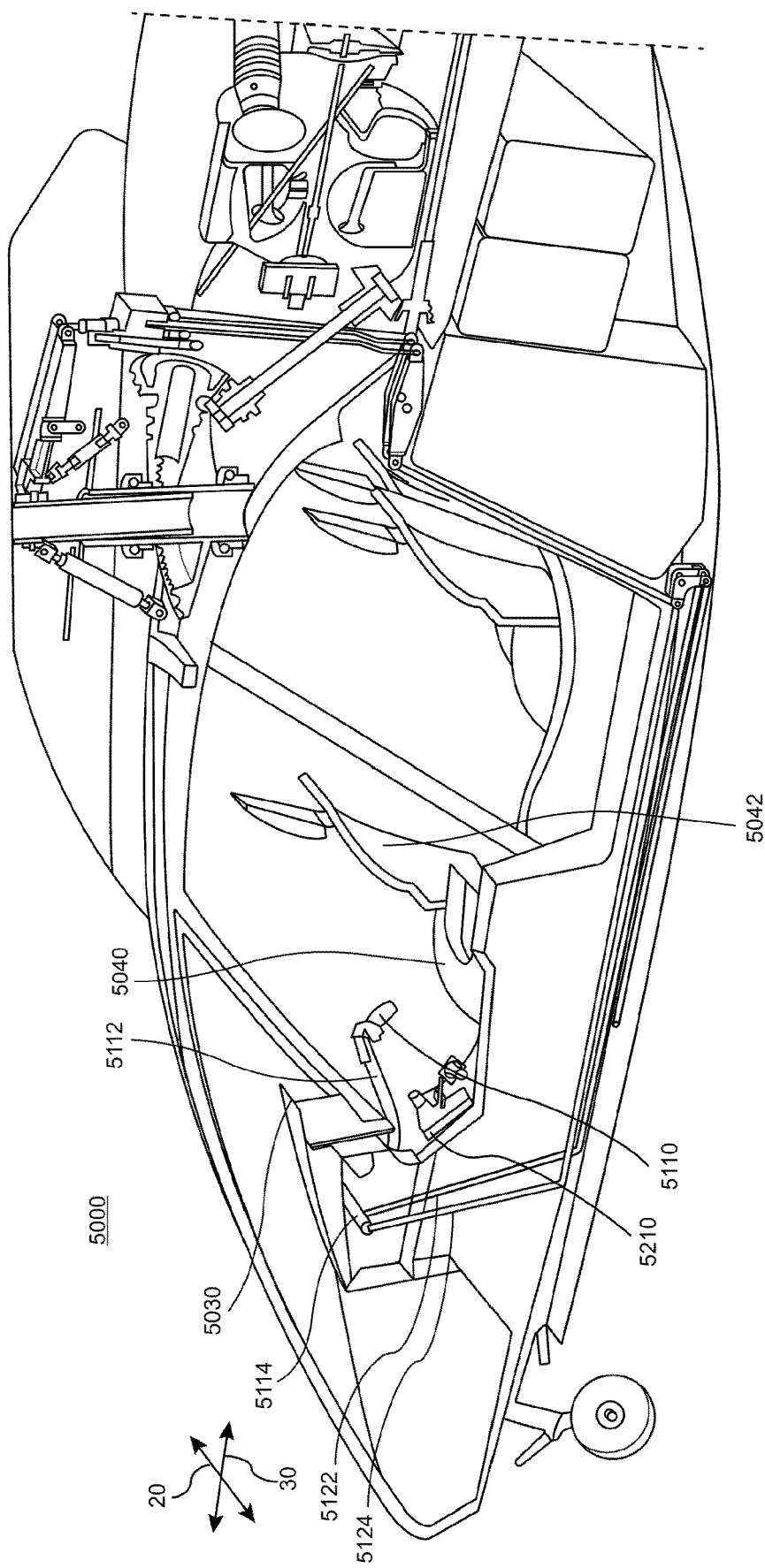
FIG. 7 shows a cross-sectional view of an example helicopter cabin having a pilot control arrangement from the side.

FIG. 7 shows a cross-sectional view of the cabin of FIG. 6 from a vertical plane that passes through the centre line of the aircraft from front to back and shows the pilot control system 5000.

The cyclic handle 5110 can be seen above the pilot's seat 5040, slightly forward of the seatback 5042, and extending downward from the elongate connector 5112 at a slight angle to the vertical for ease of gripping.

The elongate connector 5112 is shown extending in a generally forwards direction from the cyclic handle 5110, with a slight downward curve so that it passes below the instrument panel 5030. The transverse arm 5114 can be seen forward of, or behind, the instrument panel 5030 with its longitudinal axis across the aircraft from one side to the other. The first support arm 5122 and second support arm 5124 that are coupled to the transverse arm 5114 are also shown extending generally downwards below the floor of the cabin.

Dual Control

Although the figures only show a single set of controls, the presently described pilot control system 5000 is particularly useful for dual-control aircraft, particularly where the aircraft is arranged for two pilots (or one pilot and one co-pilot) to be seated next to (adjacent) one another.

Where dual controls are provided, an additional (auxiliary or further) cyclic handle and collective handle may be provided. The auxiliary collective handle will generally be positioned to the left of the co-pilot. In the examples described above the pilot's seat has been shown on the right hand side of the aircraft, with the collective handle towards the central longitudinal line of the aircraft, so in this case the auxiliary or further collective handle would be positioned towards the left hand side of the aircraft.

The auxiliary cyclic handle is position able above the second or co-pilot's seat so that it can be gripped by the co-pilot during flight. A further elongate connector is also provided, generally in a mirror image of the first elongate connector. The further elongate connector extends forwardly of the auxiliary cyclic handle. The elongate transverse arm extends past the central line of the aircraft With reference to FIGS. 3 to 5, the elongate transverse arm 5114 may be roughly doubled in length to extend in a transverse direction towards the left side of the aircraft. However in preferred embodiments a further elongate transverse arm is provided and rotatably secured in the cyclic connecting tube 5126. This allows independent up/down motion of the two cyclic handles. A forward shoulder of the extended transverse arm 5114 or of the further elongate transverse arm would join the left hand end of the transverse arm 5114 to the further elongate connector, which in turn is connected to the auxiliary cyclic handle, positionable in-line with the main cyclic handle 5110.

In preferred embodiments, the auxiliary cyclic handle is movable upwards and downwards independently of the main/primary cyclic handle. Thus either or both of the main cyclic handle 5110 and the auxiliary cyclic handle may be repositioned at any one time to allow entry or exit of the pilot or co-pilot, respectively, in or out of the aircraft, or to allow the handles to be positioned at different heights, e.g. where the pilot and co-pilot are of different heights.

In some embodiments (e.g. where the elongate connectors are fixedly coupled to the transverse arm such that the transverse arm rotates as the elongate connectors and handles are rotated about the transverse arm) the main and auxiliary cyclic handles are constrained to move up and down together (or at the same rate). This still allows for both pilot and co-pilot to enter the aircraft together as both would be in an "up" position at the same time.

Advantageously, the second, or auxiliary, set of controls may be removable so that the aircraft can be flown with only one pilot and the auxiliary controls do not get in the way of a passenger who may sit in the co-pilot seat. Thus where the transverse arm 5114 is formed integrally with the main elongate connector 5112 (and optionally with the primary cyclic handle 5110), the further elongate connector and auxiliary cyclic handle would be formed as one or more separate, separable pieces.

Whilst the control arrangement 5000 has been primarily described with reference to helicopters, it could also be used in fixed wing aircraft, such as aeroplanes.

While a specific architecture is shown, any appropriate hardware/software architecture may be employed. For example, external communication may be via a wired network connection.

The above embodiments and examples are to be understood as illustrative examples. Further embodiments, aspects or examples are envisaged. It is to be understood that any feature described in relation to any one embodiment, aspect or example may be used alone, or in combination with other features described, and may also be used in combination with one or more features of any other of the embodiments, aspects or examples, or any combination of any other of the embodiments, aspects or examples. Furthermore, equivalents and modifications not described above may also be employed without departing from the scope of the invention, which is defined in the accompanying claims.

The invention claimed is:

1. A pitch and roll control arrangement for controlling both lateral and longitudinal orientation of an aircraft having a pilot's seat, wherein the control arrangement comprises:

a handle positionable above the pilot's seat and shaped to be gripped by a pilot;

an elongate connector that extends in a generally forward direction from the handle to a forward joint;

an elongate transverse arm extending generally transversely from the forward joint of the connector to a mounting location forward and to the side of the pilot in use;

a mounting arrangement configured to support the transverse arm at the mounting location to permit the transverse arm to move laterally sideways and fore and aft as the handle is moved laterally and fore and aft by the pilot; and a control coupling associated with the mounting arrangement arranged to provide at least one moving connection which moves in response to fore and aft movement and lateral movement of the handle for coupling to actuators of the aircraft;

wherein the handle is movable upward and/or downward in an arcuate path independently of the fore and aft movement and the lateral movement of the elongate transverse arm.

2. The control arrangement of claim 1, wherein the mounting arrangement comprises:

two parallel support arms extending downwardly from spaced apart mounting points on the transverse arm.

3. The control arrangement of claim 1, further comprising:
a further handle positionable above a further pilot's seat; and
a further elongate connector that extends in a generally forward direction from the further handle to a further forward joint;
and wherein the transverse arm extends beyond the mounting arrangement to the further forward joint.

4. The control arrangement of claim 1, wherein the aircraft has an instrument panel positioned forward of the pilot's seat, and wherein the elongate connector is shaped and sized to allow the mounting location to be forward of the instrument panel while the handle is positioned above the pilot's seat.

5. The control arrangement of claim 1, wherein the aircraft is a helicopter and the pitch and roll control arrangement is a cyclic controller.

6. The control arrangement of claim 5, wherein the actuators are arranged to effect control of a swashplate of the helicopter.

7. The control arrangement of claim 1, wherein the mounting arrangement constrains the transverse arm to move between a back plane in the aircraft and a forward plane in the aircraft, wherein the back plane is at least 40 cm forward of the front of a seatback of the pilot's seat and wherein the forward plane is at least 50 cm forward of the front of the seatback of the pilot's seat.

8. The control arrangement of claim 7, wherein the back plane is at least 50 cm forward of the front of the seatback of the pilot's seat and wherein the forward plane is at least 70 cm forward of the front of the seatback of the pilot's seat.

9. The control arrangement of claim 1, wherein the control coupling comprises one or more linkages for coupling the transverse arm to actuators of the aircraft.

10. The control arrangement of claim 1, wherein the actuators comprise a lateral actuator and a longitudinal actuator, and wherein the transverse arm is coupled to the one or more actuators via:
a first rod coupled to the lateral actuator that controls the lateral orientation of the aircraft; and
a second rod coupled to the longitudinal actuator that controls the longitudinal orientation of the aircraft.

11. The control arrangement of claim 10, wherein the first rod and the second rod extend in a generally downward direction from the transverse arm to a level beneath a floor of a cockpit of the aircraft.

12. A pitch and roll control system for controlling lateral and longitudinal orientation of an aircraft having a pilot's seat, wherein the pitch and roll control system comprises:
a control arrangement for controlling both lateral and longitudinal orientation of the aircraft, wherein the control arrangement comprises:
a handle positionable above the pilot's seat and shaped to be gripped by a pilot;
an elongate connector that extends in a generally forward direction from the handle to a forward joint;
an elongate transverse arm extending generally transversely from the forward joint of the connector to a mounting location forward and to the side of the pilot in use;
a mounting arrangement configured to support the transverse arm at the mounting location to permit the transverse arm to move laterally sideways and fore and aft as the handle is moved laterally and fore and aft by the pilot; and
one or more actuators that control the lateral and longitudinal orientation of the aircraft, wherein the one or more actuators are coupled to the transverse arm of the control arrangement such that movement of the transverse arm effects control of the one or more actuators during flight;
wherein the handle is movable upward and/or downward in an arcuate path independently of the fore and aft movement and the lateral movement of the elongate transverse arm.

13. An aircraft having a pilot's seat, wherein the aircraft comprises:
a pitch and roll control system for controlling lateral and longitudinal orientation of the aircraft, wherein the pitch and roll control system comprises:
a control arrangement for controlling both lateral and longitudinal orientation of the aircraft, wherein the control arrangement comprises:
a handle positionable above the pilot's seat and shaped to be gripped by a pilot;
an elongate connector that extends in a generally forward direction from the handle to a forward joint;
an elongate transverse arm extending generally transversely from the forward joint of the connector to a mounting location forward and to the side of the pilot in use;
a mounting arrangement configured to support the transverse arm at the mounting location to permit the transverse arm to move laterally sideways and fore and aft as the handle is moved laterally and fore and aft by the pilot; and
one or more actuators that control the lateral and longitudinal orientation of the aircraft, wherein the one or more actuators are coupled to the transverse arm of the control arrangement such that movement of the transverse arm effects control of the one or more actuators during flight;
wherein the handle is movable upward and/or downward in an arcuate path independently of the fore and aft movement and the lateral movement of the elongate transverse arm.

14. The aircraft of claim 13, the aircraft including a cockpit having an instrument panel, wherein the mounting arrangement is located within, under or behind a portion of the instrument panel and wherein at least one connector extends into or under a portion of the instrument panel.

* * * * *